(12) United States Patent
Durdevic et al.

(10) Patent No.: US 10,647,381 B2
(45) Date of Patent: May 12, 2020

(54) DISPLAY UNIT AND ELECTRIC BICYCLE

(71) Applicant: BIKETEC AG, Huttwil (CH)

(72) Inventors: Ivica Durdevic, Huttwil (CH); Lukas Beat Studer, Neuendorf (CH); Philipp Walter Suter, Emmen (CH); Simon Lanz, Gondiswil (CH); Robin Woodtli, Solothurn (CH); Timo Woelk, Fischbachau (DE); Omar Afzal, Munich (DE)

(73) Assignee: BIKETEC AG, Huttwil (CH)

( * ) Notice: Subject to any disclaimer, the term of this patent is extended or adjusted under 35 U.S.C. 154(b) by 0 days.

(21) Appl. No.: 15/905,142

(22) Filed: Feb. 26, 2018

(65) Prior Publication Data

US 2018/0251184 A1 Sep. 6, 2018

Related U.S. Application Data

(63) Continuation of application No. PCT/EP2016/070082, filed on Aug. 25, 2016.

(30) Foreign Application Priority Data

Aug. 25, 2015 (DE) .......................... 10 2015 216 178
Aug. 25, 2015 (DE) .......................... 10 2015 216 186
Aug. 25, 2015 (DE) .......................... 10 2015 216 188

(51) Int. Cl.
*B62K 19/40* (2006.01)
*B62M 6/55* (2010.01)
(Continued)

(52) U.S. Cl.
CPC .............. *B62M 6/55* (2013.01); *B60K 35/00* (2013.01); *B62J 99/00* (2013.01); *B62K 19/30* (2013.01);
(Continued)

(58) Field of Classification Search
CPC . B62M 6/50; B62M 6/55; B62M 6/45; B62M 25/08; B62M 2025/003;
(Continued)

(56) References Cited

U.S. PATENT DOCUMENTS 5,789,702 A 8/1998 Perella
6,204,752 B1 3/2001 Kishimoto
(Continued)

FOREIGN PATENT DOCUMENTS

CN 1343598 A 4/2002
CN 1443686 A 9/2003
(Continued)

OTHER PUBLICATIONS

International Search Report with German Written Opinion for Application No. PCT/EP2016/070081 dated Nov. 18, 2016.
(Continued)

*Primary Examiner* — Justin M Larson
*Assistant Examiner* — Matthew T Theis
(74) *Attorney, Agent, or Firm* — Jenkins, Wilson, Taylor & Hunt, P.A.

(57) ABSTRACT

A display unit for an electric bicycle, the display unit being fastenable to a handlebar of bicycle with the aid of a holding assembly. A display unit is mountable with the aid of holding assembly optionally in a first mounting position closer to the rider or in a second mounting position further away from the rider. Furthermore disclosed is an electric bicycle having such a display unit.

16 Claims, 8 Drawing Sheets

(51) Int. Cl.
| | |
|---|---|
| *B62M 6/50* | (2010.01) |
| *B62K 23/06* | (2006.01) |
| *B62K 19/30* | (2006.01) |
| *B62K 23/02* | (2006.01) |
| *B62M 6/45* | (2010.01) |
| *B60K 35/00* | (2006.01) |
| *B62J 99/00* | (2020.01) |
| *B62M 25/08* | (2006.01) |
| *G06F 3/02* | (2006.01) |
| *B62M 25/00* | (2006.01) |
| *B62K 21/12* | (2006.01) |

(52) U.S. Cl.
CPC .............. *B62K 19/40* (2013.01); *B62K 23/02* (2013.01); *B62K 23/06* (2013.01); *B62M 6/45* (2013.01); *B62M 6/50* (2013.01); *B62M 25/08* (2013.01); *G06F 3/02* (2013.01); *B62J 2099/0033* (2013.01); *B62K 21/12* (2013.01); *B62K 2204/00* (2013.01); *B62M 2025/003* (2013.01)

(58) Field of Classification Search
CPC ........ B62K 21/12; B62K 35/00; B62K 19/30; B62K 19/40; B62K 23/02; B62K 23/06; B62K 2204/00; B62J 99/00; B62J 2099/0033; G06F 3/02
USPC .......................................................... 224/420
See application file for complete search history.

(56) References Cited

U.S. PATENT DOCUMENTS

| | | | |
|---|---|---|---|
| 6,400,564 B1 | 6/2002 | Nishimoto et al. | |
| 6,401,997 B1 | 6/2002 | Smerdon, Jr. | |
| 6,584,872 B1 | 7/2003 | Kojima | |
| 6,682,087 B1 * | 1/2004 | Takeda ..................... | B62J 99/00 280/238 |
| 7,976,048 B2 | 7/2011 | Bartolome Garcia et al. | |
| 8,469,381 B2 | 6/2013 | Dodman et al. | |
| 8,525,793 B2 | 9/2013 | Sentchenkoff et al. | |
| 8,857,550 B2 | 10/2014 | Kim et al. | |
| 8,979,111 B2 | 3/2015 | Dal Pozzo | |
| 9,150,272 B1 | 10/2015 | Thompson | |
| 9,287,063 B2 | 3/2016 | Mueller et al. | |
| 9,483,133 B2 | 11/2016 | Gondo | |
| 2001/0039850 A1 | 11/2001 | Masui et al. | |
| 2001/0040204 A1 * | 11/2001 | Irie .......................... | B62J 99/00 248/230.1 |
| 2002/0079211 A1 | 6/2002 | Katayama et al. | |
| 2004/0039522 A1 | 2/2004 | Jwo | |
| 2004/0239489 A1 | 12/2004 | Takeda | |
| 2005/0204854 A1 | 9/2005 | McLaughlin et al. | |
| 2005/0280244 A1 | 12/2005 | Watarai | |
| 2006/0186631 A1 | 8/2006 | Ishikawa | |
| 2008/0180233 A1 | 7/2008 | Miglioranza | |
| 2008/0298613 A1 | 12/2008 | Slamka et al. | |
| 2008/0312799 A1 | 12/2008 | Miglioranza | |
| 2009/0002198 A1 | 1/2009 | Bach | |
| 2009/0107825 A1 | 4/2009 | Chou et al. | |
| 2009/0170660 A1 * | 7/2009 | Miglioranza .......... | A63B 24/00 482/1 |
| 2010/0237120 A1 | 9/2010 | Muehlberger | |
| 2011/0267178 A1 | 11/2011 | Nishihara et al. | |
| 2012/0049483 A1 | 3/2012 | Dodman et al. | |
| 2012/0159328 A1 | 6/2012 | Millington et al. | |
| 2012/0221205 A1 | 8/2012 | Ichida et al. | |
| 2012/0228107 A1 | 9/2012 | Funakoshi et al. | |
| 2012/0316710 A1 | 12/2012 | Saida | |
| 2013/0054068 A1 | 2/2013 | Shoge | |
| 2013/0228424 A1 | 9/2013 | Beck | |
| 2013/0257609 A1 | 10/2013 | Otsuji et al. | |
| 2013/0334874 A1 * | 12/2013 | Shirai ..................... | B62M 25/08 307/9.1 |
| 2014/0080661 A1 | 3/2014 | Paick et al. | |
| 2014/0216198 A1 | 8/2014 | Kariyama et al. | |
| 2014/0252746 A1 | 9/2014 | Talavasek et al. | |
| 2014/0353134 A1 | 12/2014 | Müller | |
| 2015/0100204 A1 | 4/2015 | Gondo | |
| 2015/0130944 A1 | 5/2015 | Hsu | |
| 2015/0151672 A1 | 6/2015 | Hsu | |
| 2016/0089072 A1 | 3/2016 | Tetsuka | |
| 2016/0144918 A1 | 5/2016 | Lee | |
| 2017/0073040 A1 | 3/2017 | Djakovic et al. | |
| 2017/0320533 A1 | 11/2017 | Hayashi | |
| 2018/0251180 A1 | 9/2018 | Durdevic et al. | |
| 2018/0251188 A1 | 9/2018 | Durdevic et al. | |
| 2018/0362106 A1 | 12/2018 | Miles | |

FOREIGN PATENT DOCUMENTS

| | | | | |
|---|---|---|---|---|
| CN | 201287793 Y | 8/2009 | | |
| CN | 102233932 A | 11/2011 | | |
| CN | 202320636 U | 7/2012 | | |
| CN | 202429321 | 9/2012 | | |
| CN | 102741116 A | 10/2012 | | |
| CN | 202716986 U | 2/2013 | | |
| CN | 202911871 U | 2/2013 | | |
| CN | 103661769 A | 3/2014 | | |
| CN | 203958429 U | 11/2014 | | |
| CN | 204077923 U | 1/2015 | | |
| CN | 104516642 A | 4/2015 | | |
| DE | 29922486 U1 | 5/2000 | | |
| DE | 10 2006 032016 A1 | 1/2008 | | |
| DE | 102007040738 A1 * | 3/2009 | .............. | B62J 99/00 |
| DE | 10 2010 039860 A1 | 3/2012 | | |
| DE | 202012104592 U1 * | 12/2012 | .............. | H04M 1/04 |
| DE | 10 2012 200597 A1 | 7/2013 | | |
| DE | 20 2012 007991 U1 | 12/2013 | | |
| DE | 20 2013 002491 U1 | 6/2014 | | |
| DE | 20 2007 019659 U1 | 4/2015 | | |
| EP | 1342654 A2 | 9/2003 | | |
| EP | 2581296 A1 | 4/2013 | | |
| EP | 2868563 A1 | 5/2015 | | |
| EP | 2868564 A1 | 5/2015 | | |
| JP | 2015 044463 A | 3/2015 | | |
| KR | 2011 0114962 A | 10/2011 | | |
| KR | 2013 0013115 A | 2/2013 | | |
| TW | 201524838 A | 7/2015 | | |
| WO | WO 2011/081359 A2 | 7/2011 | | |
| WO | WO 2017/032832 A1 | 3/2017 | | |
| WO | WO 2017/032836 A1 | 3/2017 | | |

OTHER PUBLICATIONS

International Search Report with German Written Opinion for Application No. PCT/EP2016/070082 dated Nov. 18, 2016.
International Search Report with German Written Opinion for Application No. PCT/EP2016/070085 dated Nov. 18, 2016.
German Office Action for Application No. 10 2015 216 178.1 dated May 17, 2016.
German Office Action for Application No. 10 2015 216 186.2 dated May 19, 2016.
German Office Action for Application No. 10 2015 216 188.9 dated May 24, 2016.
English International Preliminary Examination Report and Written Opinion for Application No. PCT/EP2016/070081 dated Feb. 27, 2018.
English International Preliminary Examination Report and Written Opinion for Application No. PCT/EP2016/070082 dated Feb. 27, 2018.
English International Preliminary Examination Report and Written Opinion for Application No. PCT/EP2016/070085 dated Feb. 27, 2018.
Non-Final Office Action for U.S. Appl. No. 15/905,191 dated Sep. 17, 2018.
Final Office Action for U.S. Appl. No. 15/905,191 dated Feb. 7, 2019.
Non-Final Office Action for U.S. Appl. No. 15/905,191 dated Jun. 19, 2019.

(56) References Cited

OTHER PUBLICATIONS

Chinese Office Action for Application No. 201680061756.4 dated Jul. 2, 2019.
Chinese Office Action for Application No. 201680061787 dated Jul. 3, 2019.
Chinese Office Action for Application No. 201680061688.1 dated Jul. 10, 2019.
Notice of Allowance and Interview Summary for U.S. Appl. No. 15/905,191 dated Oct. 30, 2019.
European Office Action for Application No. 16757869.9 dated Oct. 30, 2019.
European Office Action for Application No. 16759723.6 dated Oct. 30, 2019.
Non-Final Office Action for U.S. Appl. No. 15/905,124 dated Oct. 2, 2019.

* cited by examiner

DISPLAY UNIT AND ELECTRIC BICYCLE

CROSS-REFERENCE TO RELATED APPLICATIONS

This application is a continuation of and claims priority to PCT/EP2016/070082 filed Aug. 25, 2016, which claims the benefit of and priority to German Patent Application Nos. DE 10 2015 216 178.1, DE 10 2015 216 186.2 and DE 10 2015 216 188.9, each filed Aug. 25, 2015, the entire disclosures of which are incorporated by reference herein.

TECHNICAL FIELD

The present disclosure relates to a display unit and electric bicycle.

BACKGROUND

Electric bicycles, such as pedelecs or e-bikes, enjoy great popularity as an easy-to-use, emission-free means of transportation. Particularly suitable types of bicycles are available for different fields of application. These include, inter alia, bicycles optimized for leisure time use or for the way to work, on the road or in light terrain (for example, city bikes or touring bikes) and e-mountain bikes (E-MTB), which have been developed in various designs for off-road use and especially for mountainous terrain. Electric bicycles offer the possibility to increase the operating radius without overstraining the rider and to increase the average driving speed.

Electric bicycles are known from the prior art, which in addition to a drive unit and a battery unit also have a display unit and a remote control unit for the display unit. The disadvantage of such display units is that they can only be installed in an installation position on the handlebars of the bicycle. The display units are therefore not adaptable to different bicycle geometries and rider preferences. A modular concept including display units which can be mounted on different types of bicycles is therefore not possible, since modified attachments are required in each case.

SUMMARY

For this reason, an object of the present disclosure is to provide a novel display unit, which aligns electrically assisted mobility with the demands of athletic and lifestyle-oriented cyclists.

This object is achieved by a display unit and electric bicycle having features disclosed herein.

A display unit according to the present disclosure for an electric bicycle is attached to the handlebar of the bicycle with the aid of a holding assembly. The display unit according to the present disclosure is mountable with the aid of the holding assembly optionally either in a first mounting position, which is closer to the rider or faces the rider more (a so-called compact position), or a second mounting position further away from the rider (a so-called comfort position). The display unit is therefore modularly mountable to different types of bicycles. An adaptation to rider requests is possible without further fastening elements. An adaptation to different seat positions and handlebars is particularly possible. The first mounting position allows a compact bicycle design because the overall length is minimized. The display unit is preferably mounted as desired in the first or second mounting position on the bicycle during assembly of the bicycle. Preferably, the display unit is not removable by the rider.

In a particularly preferred embodiment of the present disclosure, the holding assembly for the first mounting position is mountable on the display unit in a rotated manner relative to an assembly for the second mounting position.

It has proven to be particularly advantageous if the holding assembly is provided with two holding cheeks situated parallel, which engage around the handlebar at least in sections.

Preferably, one holding cheek is situated to the left of the stem and one holding cheek to the right of the stem. As a result, a compact and high-strength installation of the display unit is achieved.

The holding cheeks extend at an angle to the display unit. As a result, the first or optionally second mounting position is achieved in a rotated assembly.

According to a particularly preferred embodiment of the present disclosure, the holding cheeks are fastened laterally on the display unit. Preferably, the holding cheeks are fixed laterally with the aid of screws. The selection of the mounting position therefore occurs by choosing a side for the holding cheeks.

The display unit preferably has an approximately rectangular housing situated in a wide format. The upper side of the housing facing the rider in the edge region is provided with, in particular faceted, inclined surfaces.

It has proven to be advantageous if the display unit has an approximately rectangular display situated in a wide format. The display preferably extends into the edge region of the housing, only a narrow edge being provided. As a result, the best possible use of the display area and thus a very good information potential for the rider are provided.

Below the display, an on/off key switch facing the rider can be provided approximately centrally. The switch is preferably disposed in a wide format and is approximately rectangular. To facilitate the operation, the edge of the switch may be illuminated. The upper side of the housing facing the rider is provided with, preferably faceted, inclined surfaces so that the switch is also ergonomically inclined in the direction of the rider.

According to the present disclosure, at least one electrical connection, in particular a USB connection, can be provided on the side of the display unit facing the rider. The connection is situated in an access opening of the housing. The access opening is closeable with the aid of a cover, in particular a downwardly opening rubber cover. Particularly preferred is a standard USB socket so that, unlike mini-connectors, no adapter is necessary.

In a particularly preferred embodiment of the display unit, the line connectors, preferably all line connectors (cable outlets), are provided on a side facing away from the rider. In this instance, the line connectors are situated on the side of the display unit facing away from the rider. Preferably, the line connectors are designed as connection sockets. Preferably, all cables are pluggable, for example via HIGO plugs.

The line connectors are preferably situated in an angled manner so that they extend at an angle in an inclined forward direction. As a result, the line connectors, compared to conventional, only downwardly or forwardly extending connectors for plug mounting, are easily accessible and the available installation space is optimally used.

To operate the display unit, a remote control unit (remote) is preferably provided, which is ergonomically situated in the region of a handlebar grip remote from the display unit.

In a particularly preferred embodiment of the present disclosure, the remote control unit has assistance selection keys for the selection of the assistance level for the display unit and at least one input device for the menu navigation and selection of menu items shown on the display unit.

It has proven to be particularly advantageous if input device and assistance selection keys are situated along a common line. The common line can be multi-dimensionally curved in an ergonomically arcuate manner.

The input device and the keys are preferably situated one below the other in such a manner that they are ergonomically operable by the thumb of the rider. A safety-critical repositioning of the hands of the rider is not required for operating the assistance selection keys and the input device.

In a particularly preferred embodiment of the present disclosure, the input device is configured as a joystick. As a result, the menu navigation and selection of menu items shown on the display unit can be carried out intuitively and ergonomically, preferably by the thumb of the rider.

The joystick is preferably movable in all four directions (upward and downward, left and right), the selection/selection of menu items being carried out with the aid of pressure onto the joystick (pressure function). The menu navigation and selection of the menu items is carried out with the multi-functional joystick, so that no further operating elements are required. For this reason, the remote control unit is configured in an extremely compact and aesthetically pleasing manner. The joystick may have a backlit symbol, in particular a rectangle having rounded corners.

It has proven to be particularly advantageous if the assistance selection keys are situated in an inclined manner to one another. In this instance, the selection of the assistance level may be carried out by the thumb of the rider. The assistance selection keys preferably form a concave section. The thumb can rest between the keys situated one above the other so that the operation is carried out intuitively, the assistance selection key for increasing the assistance level preferably being situated in the front in the direction of travel and the assistance selection key for reducing the assistance level in the rear in the direction of travel.

Furthermore, it is preferable that the assistance selection keys are inclined toward the hand of the rider. The operation can be carried out ergonomically preferably by the thumb of the rider.

The assistance selection key for increasing the assistance level is preferably marked with a plus symbol and the assistance selection key for reducing the assistance level is preferably marked with a minus symbol. The symbols are preferably backlit and, for this reason, recognizable even in conditions of poor visibility.

Regarding manufacturing technology and operation, it has proven advantageous that the assistance selection keys have a free actuation section facing the hand of the rider and an elastically mounted end section.

According to a preferred embodiment of the present disclosure, a light switch is laterally offset in the area between the assistance selection keys. Preferably, the light switch is situated in the direction remote from the hand of the rider next to the assistance selection keys. It has proven to be particularly ergonomic if the light switch is situated laterally offset in the middle between the assistance selection keys.

Preferably, the light switch has three functions, each of which are activated sequentially by pressing a key: keep key pressed (>2 s), light on/off; push key, dipped beam, push key for the second time, light lights up. As a result, advantageously there is one key for light on/low/high/off. The light switch may have a backlit light symbol.

In electric bicycles having an electronic gearshift of the geared motor, the remote control unit preferably has along a pivot axis a centrally mounted rocker switch for gear selection. According to the present disclosure, it is advantageous if the rocker switch has two actuation surfaces, a first actuation surface being situated on the side facing the hand of the rider and a second actuation surface being situated on the side facing away from the hand of the rider. Preferably, input device, assistance selection keys and rocker switch are situated along a common line. The keys are preferably situated one below the other in such a manner that they are ergonomically operable by the thumb of the rider. A safety-critical repositioning of the hands of the rider is not required for operating the assistance selection keys and the rocker switch.

In a preferred embodiment of the remote control unit, the remote control unit has an upper part and a modular exchangeable lower part, the rocker switch being assigned to the lower part. For this reason, the remote control unit is modularly adaptable to bicycles with and without an electric geared motor. For this purpose, a lower part designed as a clamp half is mounted with or without a rocker switch. The upper part and lower part are preferably electrically connected with the aid of a flexible band.

The rocker switch preferably has an approximately centrally situated automatic key. The automatic key preferably does not rock and activates the automatic gear selection, for example, a first gear and a second gear.

When viewed in the direction of the handlebar grip axis, the input device, assistance selection keys and rocker switch preferably extend along a convexly arcuate common line, the curvature curve of which is ergonomically adapted to the movement range of the thumb of the rider.

Preferably, the remote control unit has a vibration motor. For example, having reached the highest assistance level can be signaled with the aid of a short vibration. Furthermore, a switching operation can be proposed with the aid of a short vibration. Preferably, a gear proposal is made on the display unit, for example, an upward arrow on the display suggesting to shift up, the vibration alerting the rider that the display unit is displaying new information.

The present disclosure can be used universally in all types of bicycles, especially in mountain bikes (both in hardtail or full-suspension design), but also can be implemented in other bicycles, for example, road bike frames and, thus, ultimately resulting in a touring, city or cross-bike or other modern types of bicycles. Because of its compact, attractive design, it enables the construction of bikes which largely combine the advantages of a classic bicycle and an electric bicycle.

BRIEF DESCRIPTION OF THE DRAWINGS

A preferred embodiment of the present disclosure is subsequently explained in greater detail in reference to the appended drawings. For this purpose, in detail.

DETAILED DESCRIPTION

Figure 1:
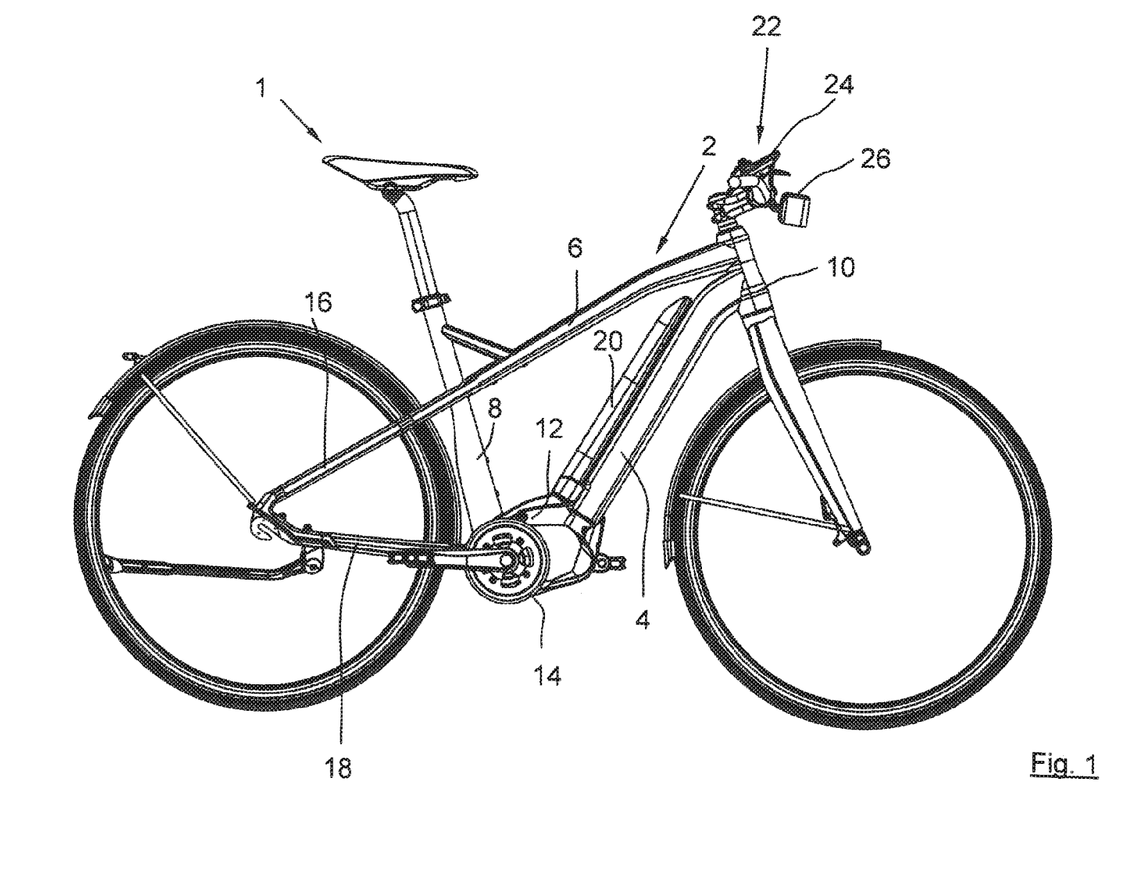
FIG. 1 shows a side view of the electric bicycle according to the present disclosure.

FIG. 1 shows a side view of an electric bicycle 1 according to the present disclosure, having an exemplary bicycle frame 2 configured as a diamond frame, having a down tube 4, a top tube 6, a seat tube 8, a head tube 10, a drive carrier 12 for a drive unit 14 and seat struts 16 and lower struts 18, as well as a battery unit 20.

Figure 2:
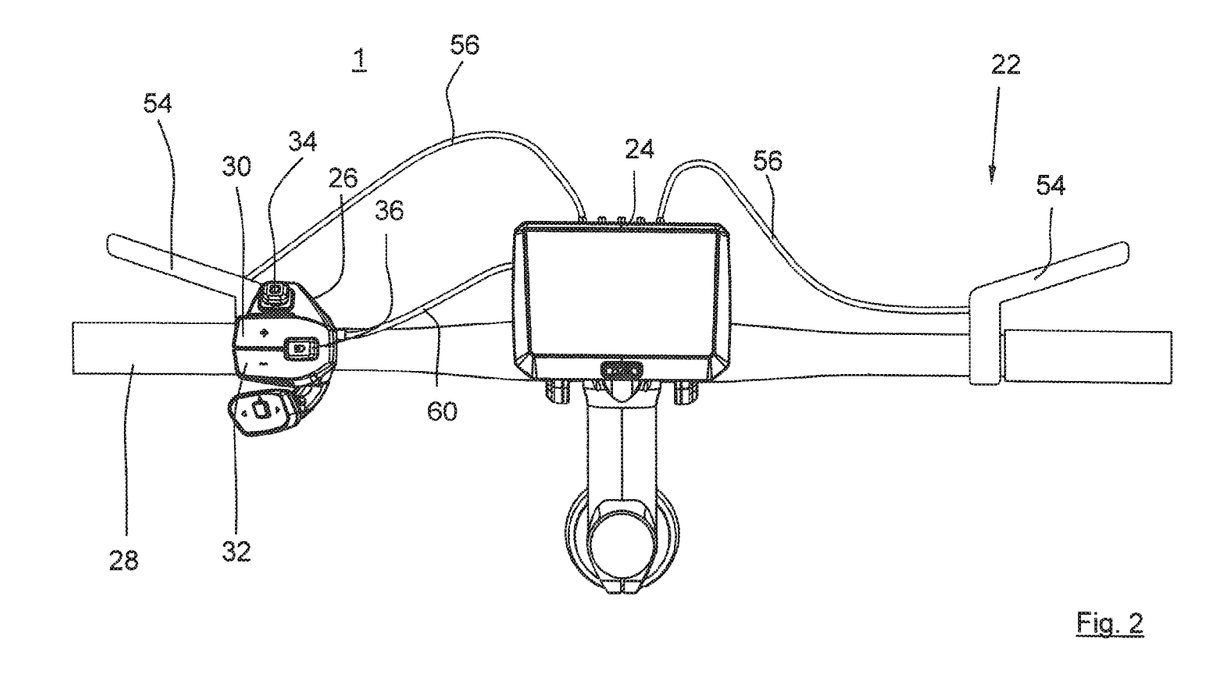
FIG. 2 shows a detailed view of the electric bicycle from FIG. 1 in the region of the handlebar.

As in particular can be concluded from FIG. 2, which shows a detailed representation of electric bicycle 1 from FIG. 1 in the region of handlebar 22, a display unit 24 situated centrally on handlebar 22 and a remote control unit 26 are provided. Remote control unit 26 is situated in the region of a left handlebar lever 28 remote from display unit 24 and has two assistance selection keys 30, 32 for the selection of the motor assistance level, and an input device designed as a joystick 34 for menu navigation and selection of menu items displayed on display unit 24. Furthermore, remote control unit 26 has a light switch 36.

Figure 3:
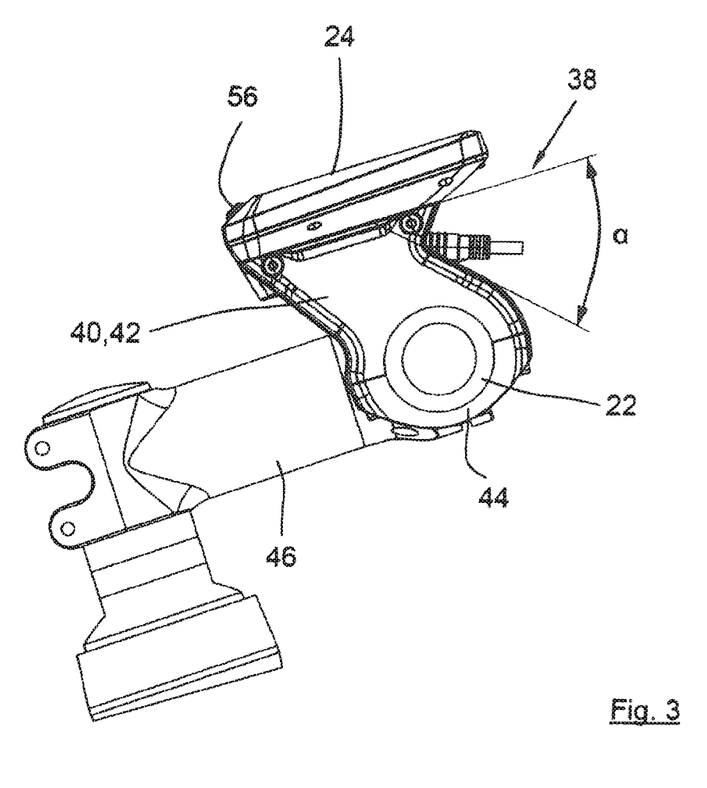
FIG. 3 shows a side view of the display unit in a first mounting position.
Figure 4:
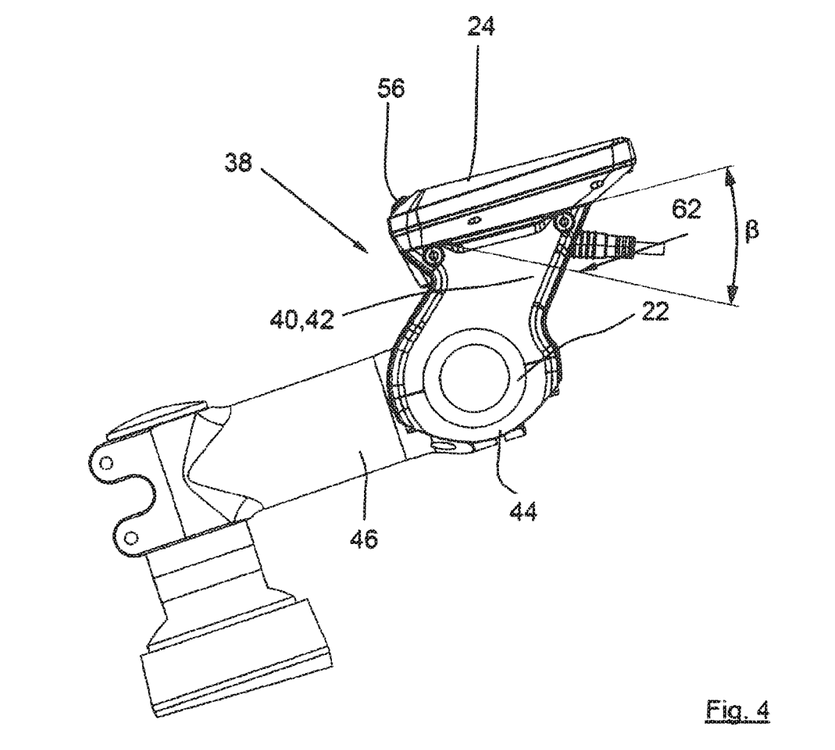
FIG. 4 shows a side view of the display unit in a second mounting position.
Figure 5:
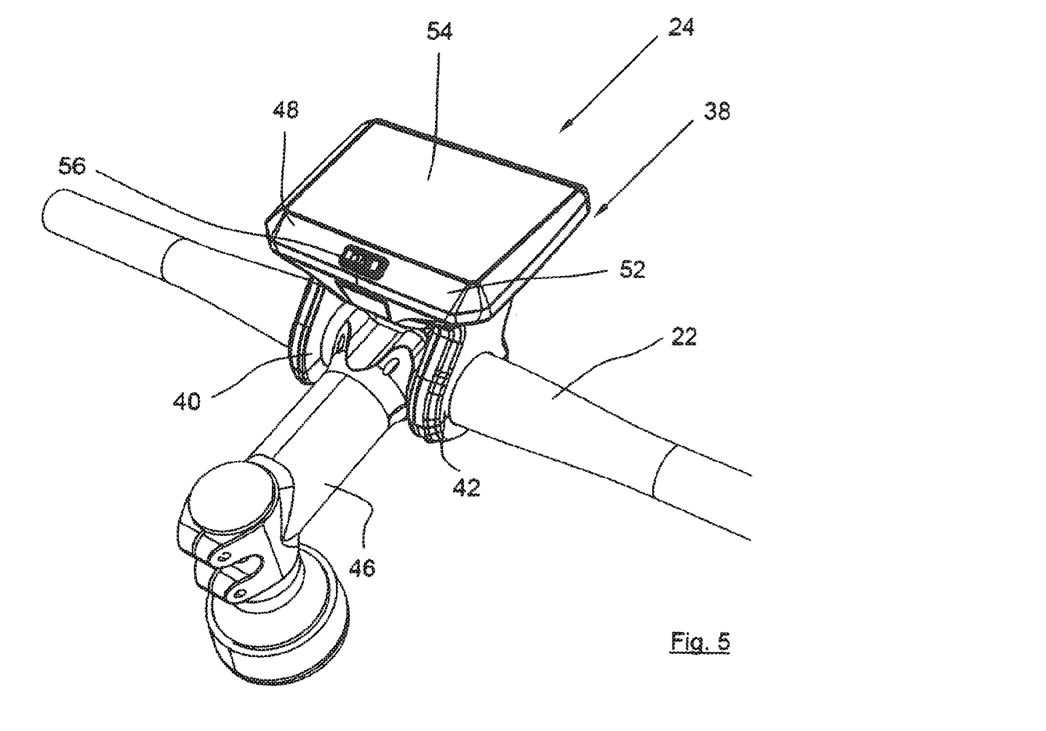
FIG. 5 shows a detailed view of the mounted display unit.

As shown in particular in FIGS. 3 and 4, which show side views of display unit 24 on handlebar 22, display unit 24 is attached to handlebar 22 of the bicycle with the aid of a holding assembly 38. Display unit 24 is mountable with the aid of holding assembly 38, optionally in accordance with FIG. 3, in a first mounting position (compact position) closer to the rider or a second mounting position (comfort position) further away from the rider in accordance with FIG. 4. For this purpose, holding assembly 38 for the first mounting position is mountable in a rotated manner relative to an assembly for the second mounting position. The display unit is therefore modularly mountable to different types of bicycles. An adaptation to rider requests is possible without further fastening elements. An adaptation to different seat and handlebar positions is possible. When assembling the bicycle, display unit 24 is preferably mounted as desired in the first or second mounting position on the bicycle.

According to FIGS. 5 through 8 showing detailed representations of mounted display unit 24, it has proven to be particularly advantageous if holding arrangement 38 has two holding cheeks 40, 42 situated parallel, which embrace handlebar 22 in a cuff-like manner using a first fastening section and, with the aid of clamping screws 44, are fixable at the handlebar. Holding cheeks 40, 42 extend at an angle to display unit 24, having an angle α in the range of about 30° to 60°, preferably approximately 45°. The fastening sections are configured substantially in a round and annular manner. One holding cheek 40 is fixed to the left of stem 46 and one holding cheek 42 is fixed to the right of the stem 46. As a result, a compact, modular installation of display unit 24 is achieved.

Holding cheeks 40, 42 are positioned laterally at display unit 24 and are fixed laterally with the aid of screws (not shown). The selection of the mounting position therefore occurs by selecting a side for holding cheeks 40, 42.

Figure 8:
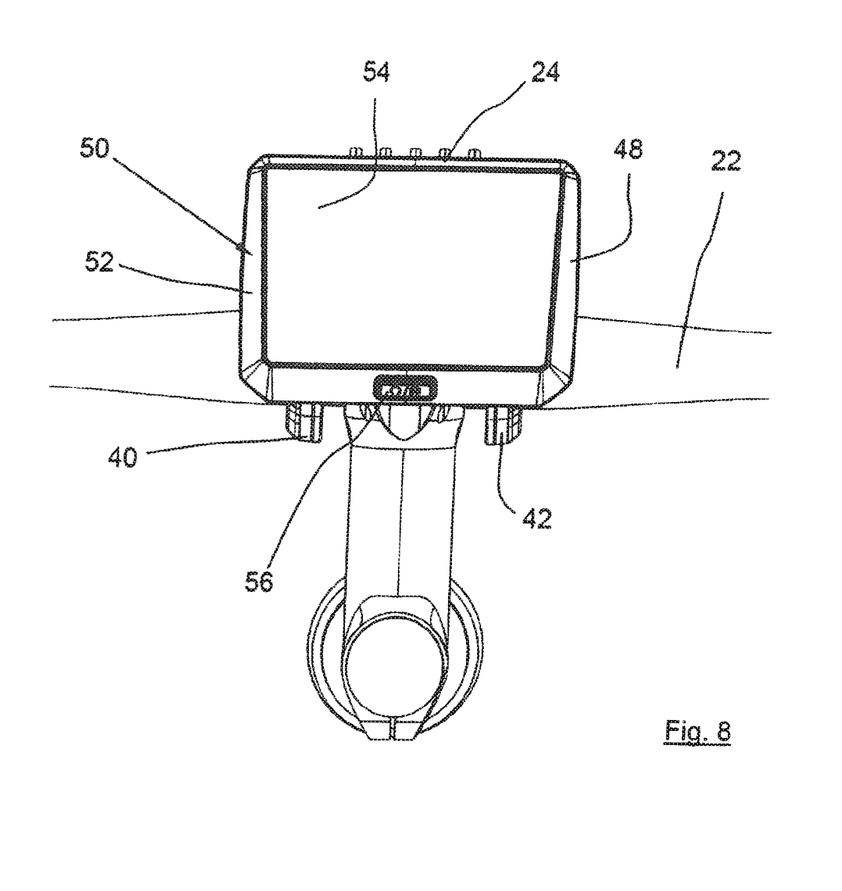
FIG. 8 shows a top view of the installed display unit.

According to FIG. 8, display unit 24 has an approximately rectangular housing 48, which is situated in a wide format. Upper housing side 50 facing the rider is provided having faceted, circumferentially inclined surfaces 52. The course of inclined surface 52 is wider on the side facing the rider than on the sides of display unit 24, which are wider than the sides on the side facing away from the rider. Display unit 24 has a wide-format, rectangular display 54 situated centrally. Display 54 preferably extends into the faceted edge region of housing 48, only a relative narrow edge being provided. As a result, the best possible use of the display area and thus a very good information potential for the rider are provided.

Below the display, an on/off key switch 56 facing the rider can be provided approximately centrally. Switch 56 has a wide format, approximately rectangular. To facilitate the operation, the edge of switch 56 is backlit. Upper side 50 of the housing facing the rider is provided in a faceted manner with inclined surfaces, so that switch 56 is ergonomically inclined in the direction of the rider.

On the side of display unit 24 facing the rider, an electric connection configured as a standard USB connection is centrally provided. The connection is situated in an access opening 58. Access opening 58 is covered with the aid of a closeable cover 60 configured as a rubber cover opening in the downward direction.

Figure 6:
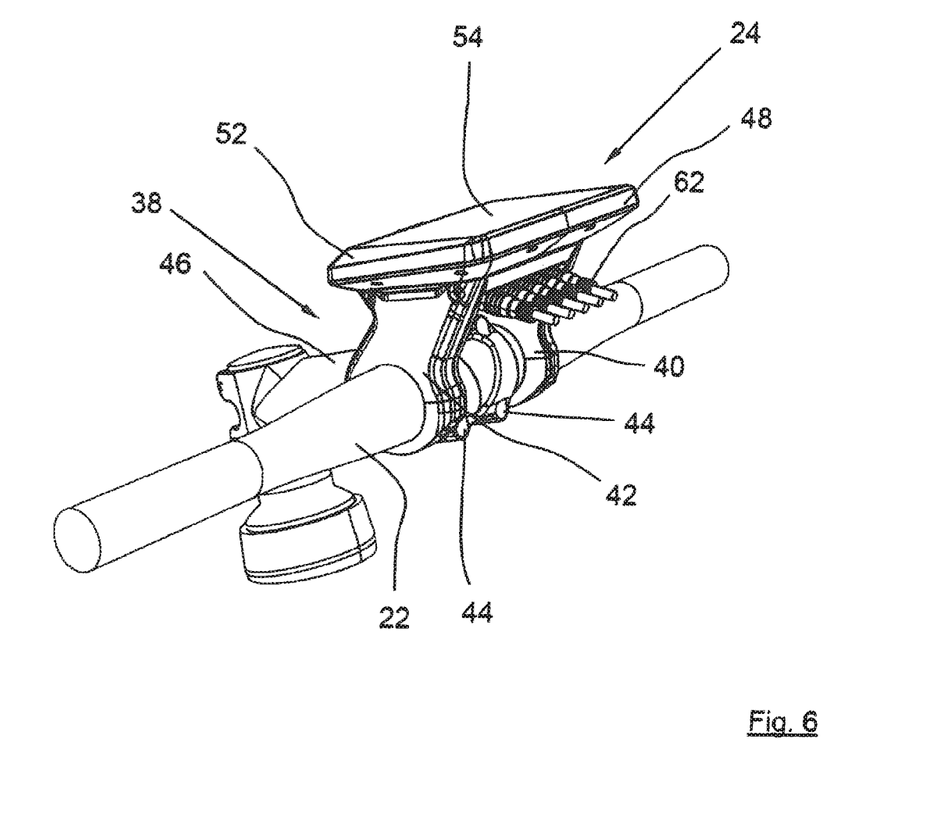
FIG. 6 shows a second detailed view of the mounted display unit.
Figure 7:
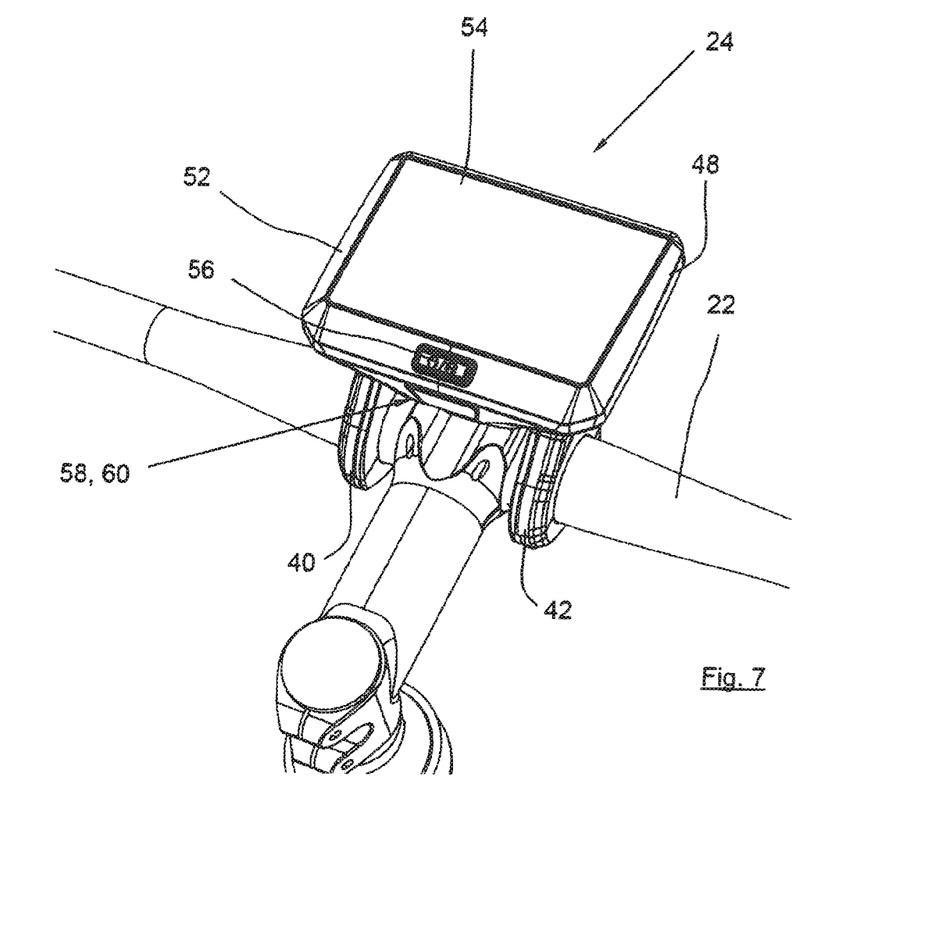
FIG. 7 shows a further detailed view of the mounted display unit.

As can be seen, in particular from FIGS. 4 and 6, all line connectors 62 of display unit 24 are provided on a side facing away from the rider. Line connectors 62 are configured as connection sockets. All cables are pluggable, for example via HIGO plugs. Line connectors 62 are situated in an angled manner so that they extend at an angle in an inclined forward direction. In this instance, the preferred angle range includes an angle β in the range of approximately 10° to 60°, preferably of approximately 30°. As a result, line connectors 62, compared to conventional, only downwardly or forwardly extending connectors for plug mounting, are easily accessible and the available installation space is optimally used.

The present disclosure can be used universally in all types of bicycles, especially in mountain bikes (both in hardtail or full-suspension design), but also can be implemented in other bicycles, for example, road bike frames and, thus, ultimately resulting in a touring, city or cross-bike or other modern types of bicycles. Because of its compact, attractive design, it enables the construction of bikes which largely combine the advantages of a classic bicycle and an electric bicycle.

The embodiment of the present disclosure is not limited to the examples shown in the figures and as explained above, but is possible in a plurality of modifications by those skilled in the art.

Disclosed is a display unit 24 for an electric bicycle 1, display unit 24 being attached to handlebar 22 of bicycle 1 with the aid of a holding assembly 38. According to the present disclosure, display unit 24 is mountable with the aid of holding assembly 38 optionally in a first mounting position closer to the rider or in a second mounting position further away from the rider. Furthermore disclosed is an electric bicycle 1 having such a display unit 24.

LIST OF REFERENCE CHARACTERS 1 electric bicycle
2 bicycle frame
4 down tube
6 top tube
8 eat tube
10 head tube
12 drive carrier
14 drive unit
16 seat strut
18 lower strut
20 battery unit
22 handlebar 24 display unit
26 remote control unit
28 left handlebar grip
30 assistance selection key
32 assistance selection key
34 joystick
36 light switch
38 holding assembly
40 holding cheek
42 holding cheek
44 clamping screw
46 stem
48 housing
50 upper side of housing
52 inclined surface
54 display
56 on/off key switch
58 access opening
60 cover
62 line connectors

The invention claimed is:

1. A display unit for an electric bicycle, wherein the display unit is fastenable with a holding assembly to a handlebar of the bicycle,
wherein the display unit with aid of the holding assembly is mountable optionally in a first mounting position closer to a rider or a second mounting position further away from the rider; and
wherein the holding assembly for the first mounting position is mountable in a rotated manner relative to the holding assembly for the second mounting position, wherein the holding assembly has two holding cheeks situated parallel and which are configured to be fixed to a handlebar of the bicycle, wherein a selection of the mounting position is achieved by selecting a side for the holding cheeks, and
wherein each of the two holding cheeks comprises a flat edge and a notched edge opposite the flat edge, and wherein the selection of the mounting position is achieved by mounting each of the holding cheeks such that the notched edges faces the rider in the first mounting position and the notched edges face away from the rider in the second mounting position and such that an orientation of the display unit with respect to the rider is maintained in both the first mounting position and the second mounting position.

2. The display unit of claim 1, wherein the two parallel holding cheeks at least in sections engage around the handlebar.

3. The display unit of claim 2, wherein one of the two parallel holding cheeks is situated left of a stem and one of the two parallel holding cheeks is situated right of the stem.

4. The display unit of claim 2, wherein the holding cheeks extend at an angle to the display unit.

5. The display unit of claim 2, wherein the holding cheeks are laterally attached to the display unit, and are fixed laterally with screws.

6. The display unit of claim 1, wherein the display unit has a rectangular housing situated in a wide format.

7. The display unit of claim 1, wherein the display unit has a rectangular display situated in a wide format.

8. The display unit of claim 7, wherein below the display an on/off key switch facing a rider is provided approximately centrally.

9. The display unit of claim 1, wherein at least one electrical connection, in particular a USB connector, is provided on a side of the display unit facing the rider.

10. The display unit of claim 1, wherein line connectors of the display unit are provided on a side facing away from a rider.

11. The display unit of claim 10, wherein the line connectors are situated at an angle such that they extend at an angle in an inclined forward direction.

12. The display unit of claim 1, comprising a remote control unit for operating the display unit, the remote unit being situated in a region of a handlebar lever remote from the display unit.

13. The display unit of claim 1, wherein the display unit has a housing situation in a wide format, and wherein the shape of the housing deviates from a rectangular shape at lateral sides and/or at corner regions of the housing.

14. The display unit of claim 1, wherein the display unit has a display situated in a wide format, and wherein the shape of the display deviates from a rectangular shape at lateral sides and/or at corner regions of the display.

15. An electric bicycle, comprising
a display unit fastened with aid of a holding assembly to a handlebar of the bicycle,
wherein the display unit with the aid of the holding assembly is mountable optionally in a first mounting position closer to a rider or in a second mounting position further away from the rider; and
wherein the holding assembly for the first mounting position is mountable in a rotated manner relative to the holding assembly for the second mounting position, wherein the holding assembly has two holding cheeks situated parallel and which are configured to be fixed to a handlebar of the bicycle, wherein a selection of the mounting position occurs by selecting a side for the holding cheeks, and
wherein each of the two holding cheeks comprises a flat edge and a notched edge opposite the flat edge, and wherein the selection of the mounting position is achieved by mounting each of the holding cheeks such that the notched edges faces the rider in the first mounting position and the notched edges face away from the rider in the second mounting position and such that an orientation of the display unit with respect to the rider is maintained in both the first mounting position and the second mounting position.

16. A method for mounting a display unit to an electric bicycle, wherein the display unit is fastenable with a holding assembly to a handlebar of the bicycle, the method comprising:
mounting the display unit in a first mounting position closer to a rider, wherein the holding assembly comprises two holding cheeks and each of the two holding cheeks comprises a flat edge and a notched edge opposite the flat edge, and wherein mounting the display unit in the first mounting position comprises mounting the holding cheeks to the handlebar such that the notched edges face the rider; and
mounting the display unit in a second mounting position further away from the rider, wherein mounting the display unit in the second mounting position comprises mounting the holding cheeks to the handlebar such that the notched edges face away from the rider;
wherein the mounting the display unit in the first and second mounting positions comprises mounting the display unit such that an orientation of the display unit with respect to the rider is maintained in both the first mounting position and the second mounting position.

* * * * *